United States Patent
Wellhoefer et al.

(10) Patent No.: US 9,714,016 B2
(45) Date of Patent: Jul. 25, 2017

(54) COMMUNICATIONS CONNECTION FOR SENSORS IN CONTROL SYSTEMS OF VEHICLES

(75) Inventors: Matthias Marcus Wellhoefer, Stuttgart (DE); Juergen Reiner, Gestratz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/236,810

(22) PCT Filed: Jun. 6, 2012

(86) PCT No.: PCT/EP2012/060668
§ 371 (c)(1),
(2), (4) Date: Feb. 3, 2014

(87) PCT Pub. No.: WO2013/017318
PCT Pub. Date: Feb. 7, 2013

(65) Prior Publication Data
US 2014/0163835 A1    Jun. 12, 2014

(30) Foreign Application Priority Data

Aug. 1, 2011   (DE) ......................... 10 2011 080 169

(51) Int. Cl.
| | |
|---|---|
| *B60T 8/1755* | (2006.01) |
| *B60T 8/171* | (2006.01) |
| *B60T 8/36* | (2006.01) |
| *H04L 12/40* | (2006.01) |

(52) U.S. Cl.
CPC .......... *B60T 8/17551* (2013.01); *B60T 8/171* (2013.01); *B60T 8/368* (2013.01); *H04L 12/40032* (2013.01); *H04L 2012/40273* (2013.01)

(58) Field of Classification Search
USPC ........................................................ 701/70
See application file for complete search history.

(56) References Cited

U.S. PATENT DOCUMENTS

| | | | | |
|---|---|---|---|---|
| 4,350,275 A | * | 9/1982 | Kuhn ................... | B65H 23/042 226/104 |
| 4,757,463 A | * | 7/1988 | Ballou ................... | F02P 17/00 701/114 |

(Continued)

FOREIGN PATENT DOCUMENTS

| | | |
|---|---|---|
| CN | 101304908 A | 11/2008 |
| CN | 201777230 U | 3/2011 |

(Continued)

OTHER PUBLICATIONS

Google translation of the WO2009130725 A1 to Vendani reference from https://www.google.com/patents/WO2009130725A1?cl=en &dq=WO+2009130725+A1&hl=en&sa=X &ved=0CBwQ6AEwAGoVChMI2sLxs9P7xwIVQjw-Ch17cwJN (dated Sep. 16, 2015).*

(Continued)

*Primary Examiner* — Jean-Paul Cass
(74) *Attorney, Agent, or Firm* — Norton Rose Fulbright US LLP; Gerard Messina

(57) ABSTRACT

A sensor is described for a regulating system in a vehicle, having a sensor element and an interface element. The interface element is set up for the communicative connection of the sensor element to a control device in a vehicle. The interface element is fashioned as a two-contact interface element.

10 Claims, 3 Drawing Sheets

(56) References Cited

U.S. PATENT DOCUMENTS

Figure 1:
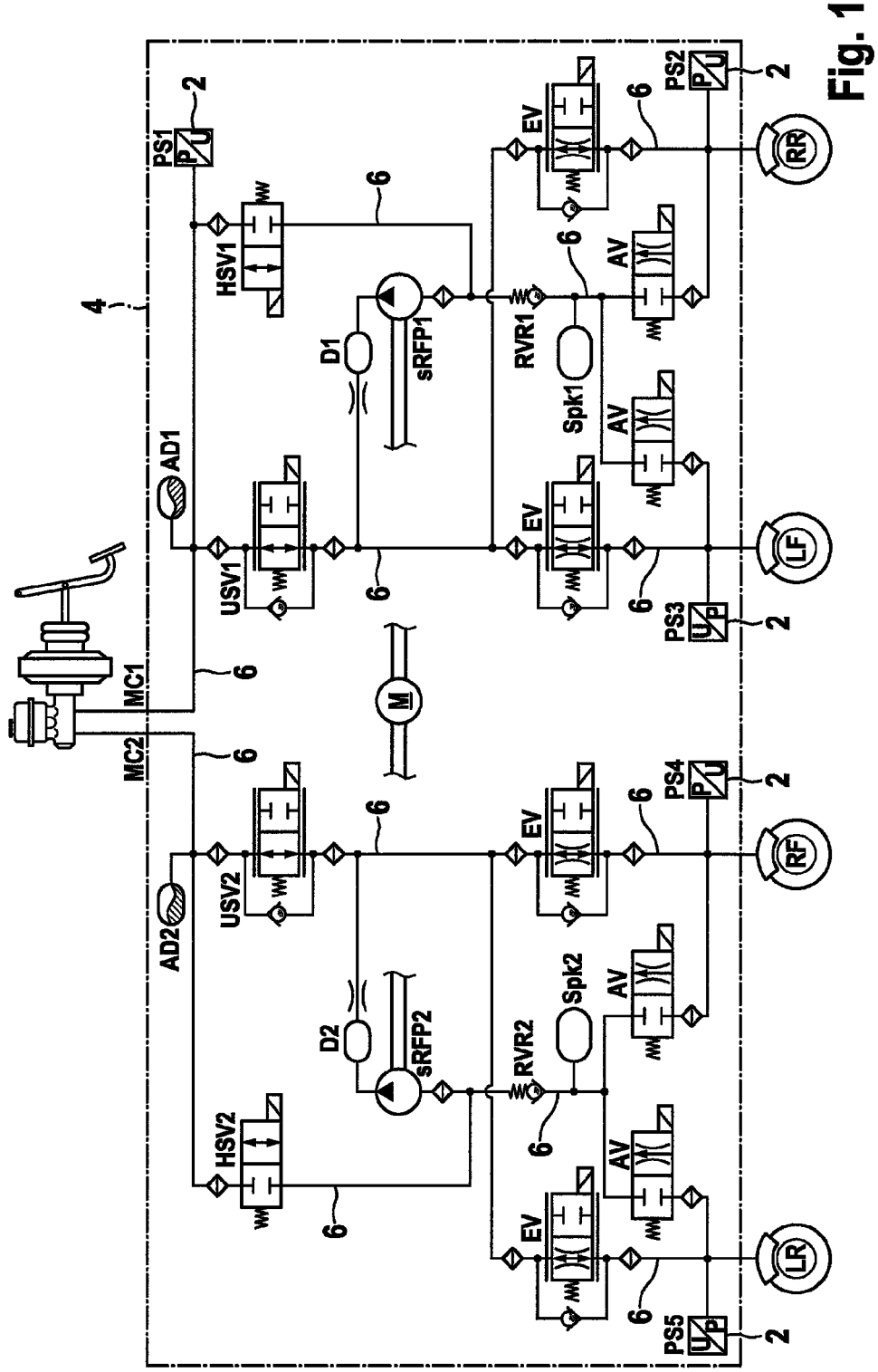

| | | | | |
|---|---|---|---|---|
| 4,887,262 A | * | 12/1989 | van Veldhuizen | G06F 13/374 370/449 |
| 5,469,150 A | * | 11/1995 | Sitte | G05B 19/054 340/3.1 |
| 5,537,549 A | * | 7/1996 | Gee | G05B 19/0421 370/442 |
| 5,600,844 A | * | 2/1997 | Shaw | G06F 9/465 348/441 |
| 5,775,470 A | * | 7/1998 | Feigel | B60G 17/01933 188/266.6 |
| 6,643,465 B1 | * | 11/2003 | Bosinger | H04B 10/27 398/10 |
| 6,943,669 B2 | | 9/2005 | Otterbach et al. | |
| 7,046,166 B2 | * | 5/2006 | Pedyash | H04Q 9/00 340/870.01 |
| 7,575,467 B2 | * | 8/2009 | Ferguson | H01R 13/44 439/188 |
| 7,835,380 B1 | * | 11/2010 | Aloni | H04L 12/40032 370/394 |
| 8,805,549 B2 | * | 8/2014 | Lill | G01D 21/00 340/870.02 |
| 9,052,775 B1 | * | 6/2015 | Salisbury | G01L 5/226 |
| 2002/0184410 A1 | * | 12/2002 | Apel | G06F 9/4411 710/5 |
| 2003/0055550 A1 | * | 3/2003 | Lohberg | B60T 8/171 701/71 |
| 2003/0086477 A1 | * | 5/2003 | Tola | G01K 1/14 374/208 |
| 2003/0184447 A1 | | 10/2003 | Otterbach et al. | |
| 2004/0000204 A1 | * | 1/2004 | Clark | G01D 11/245 73/866.5 |
| 2004/0015282 A1 | * | 1/2004 | Babala | G01L 15/00 701/70 |
| 2004/0097112 A1 | * | 5/2004 | Minich | H01R 29/00 439/101 |
| 2005/0103545 A1 | * | 5/2005 | Green | B60L 5/005 180/168 |
| 2005/0109111 A1 | * | 5/2005 | Manlove | B60R 21/01516 73/583 |
| 2006/0052905 A1 | * | 3/2006 | Pfingsten | H01R 9/2425 700/286 |
| 2006/0178804 A1 | * | 8/2006 | Laichinger | F02D 41/28 701/115 |
| 2006/0282736 A1 | * | 12/2006 | Schroth | G01R 31/3183 714/742 |
| 2007/0033312 A1 | * | 2/2007 | Flandre | H04L 12/403 710/110 |
| 2007/0118334 A1 | * | 5/2007 | Guenter | G01D 9/005 702/187 |
| 2008/0278891 A1 | * | 11/2008 | Bidenbach | G01D 18/00 361/679.02 |
| 2009/0121776 A1 | * | 5/2009 | Nagase | H04L 12/40182 327/434 |
| 2009/0234514 A1 | * | 9/2009 | Becker | G05B 19/0421 701/1 |
| 2009/0277289 A1 | * | 11/2009 | Schwesig | G05B 9/02 73/865.9 |
| 2009/0307551 A1 | * | 12/2009 | Fey | B60T 8/885 714/746 |
| 2010/0098095 A1 | * | 4/2010 | Kato | H04L 12/4625 370/401 |
| 2011/0000313 A1 | * | 1/2011 | Eckhardt | A61M 5/14 73/861.61 |
| 2011/0095914 A1 | * | 4/2011 | Velado | B63J 99/00 340/984 |
| 2011/0145454 A1 | * | 6/2011 | Dressler | H04L 12/40032 710/106 |
| 2012/0233500 A1 | * | 9/2012 | Roettgermann | G06F 11/3636 714/25 |
| 2012/0308354 A1 | * | 12/2012 | Tafazoli Bilandi | B66C 13/46 414/685 |
| 2012/0327978 A1 | * | 12/2012 | Nishimura | H04L 12/40032 375/211 |
| 2013/0317763 A1 | * | 11/2013 | Ashman | G01L 7/14 702/50 |
| 2014/0196541 A1 | * | 7/2014 | Hofsaess | G01P 1/003 73/504.12 |
| 2015/0180679 A1 | * | 6/2015 | Kesling | H04L 12/40032 375/296 |
| 2016/0153861 A1 | * | 6/2016 | Doering | G01L 19/0645 73/114.19 |

FOREIGN PATENT DOCUMENTS

| | | | | |
|---|---|---|---|---|
| DE | 102007018468 | | 10/2008 | |
| IT | WO 2009130725 A1 | * | 10/2009 | G01S 7/003 |
| WO | 2006/045826 A1 | | 5/2005 | |
| WO | WO2009/130725 | | 10/2009 | |
| WO | WO 2009130725 A1 | * | 10/2009 | G01S 7/00 |

OTHER PUBLICATIONS

International Search Report for PCT/EP2012/060668, issued on Sep. 6, 2012.

"Peripheral Sensor Interface for Automotive Applications", PSI5 Consortium, 2011, pp. 1-58.

* cited by examiner

COMMUNICATIONS CONNECTION FOR SENSORS IN CONTROL SYSTEMS OF VEHICLES

The present invention relates to regulating systems in vehicles. In particular, the present invention relates to the connection of sensors in vehicle regulating systems, or brake regulating systems. Furthermore, the present invention relates in particular to the connection of pressure sensors in ESP systems.

BACKGROUND OF THE INVENTION

Regulating systems in vehicles, for example in hybrid and/or electric vehicles, standardly have sensors, e.g. pressure sensors in a hydraulic circuit. For this purpose, one, three, or five sensors are standardly used.

A basic system has for example one pressure sensor, while an expanded system has one pressure sensor in the primary circuit and one additional pressure sensor per secondary circuit. In hybrid vehicles in particular, in most cases up to five pressure sensors are used that are integrated in a common hydraulic system.

FIG. 1 shows an example of a hydraulic circuit diagram having five pressure sensors 2 PS1 through PS5. FIG. 1 shows, as an example, the hydraulic system controlled in integrated fashion by an ESP control device 4 of a vehicle.

A centrally situated pressure sensor 2 PS1 monitors the primary circuit of the hydraulic system, while four additional pressure sensors 2 PS2 through PS5 each monitor hydraulic line 6 of the individual brake cylinders, shown situated at the four wheels as an example.

The right side of the hydraulic circuit diagram of FIG. 1 includes the primary circuit of master cylinder MC1, which operates the left front wheel (LF) and the right rear wheel (RR). The left side operates the left rear wheel (LR) and the right front wheel (RF). The dot-dashed block encloses the components of ESP control device 4.

Normally, the system pressure in the brake system can be decoupled from the brake pedal, and thus from the driver's foot, and contained. This is realized via the USV (changeover valve, open in the currentless state) and the HSV (high-pressure switching valve, closed in the currentless state). A separation is brought about by closing the USV.

The brake pressure is provided through the open USV and by the open EV (inlet valve, open in the currentless state) when the brake is actuated in the brake caliper. The backflow is blocked at each wheel by the AV (outlet valve), which is closed in the currentless state. If brake pressure has to be reduced at the wheel, the AV is opened and the brake fluid flows into storage chamber Spk1 or Spk2.

Through a check valve RVR, the return pump can thereupon also again empty the storage chambers; to accomplish this, motor M, schematically shown in the center, actuates return pumps sRFP1 and sRFP2.

Chokes D1, D2, and outflow dampers AD1 and AD2, are anti-noise measures intended to disturbing pump noise during hydraulic conveying.

The balls drawn parallel to the valves represent check valves, and the lozenges with lines through them stand for sieve elements intended to prevent contamination, e.g. dirt particles, from entering into the valves.

The hydraulic circuit diagram shown as an example in FIG. 1 having five pressure sensors 2 corresponds to a currently standard maximum expansion.

Figure 2B:
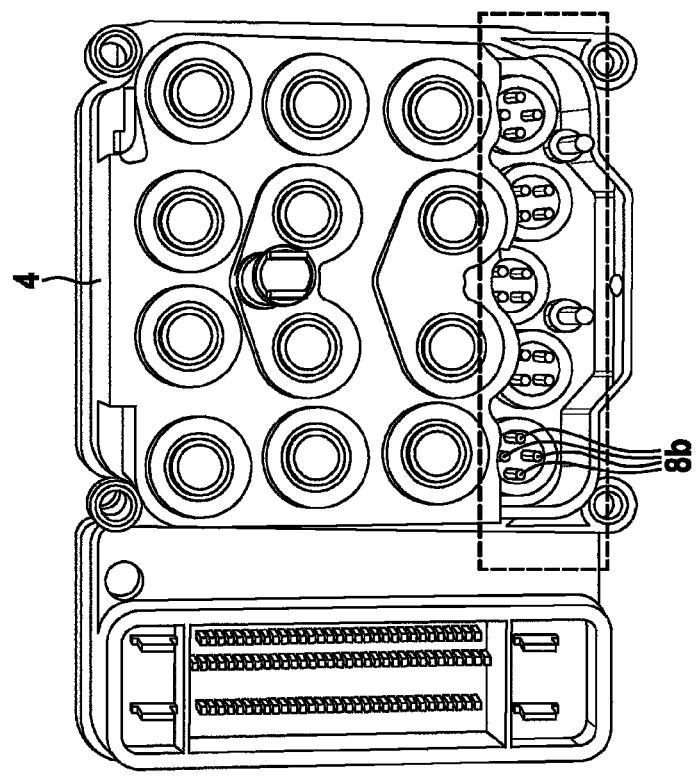
Figure 2A:
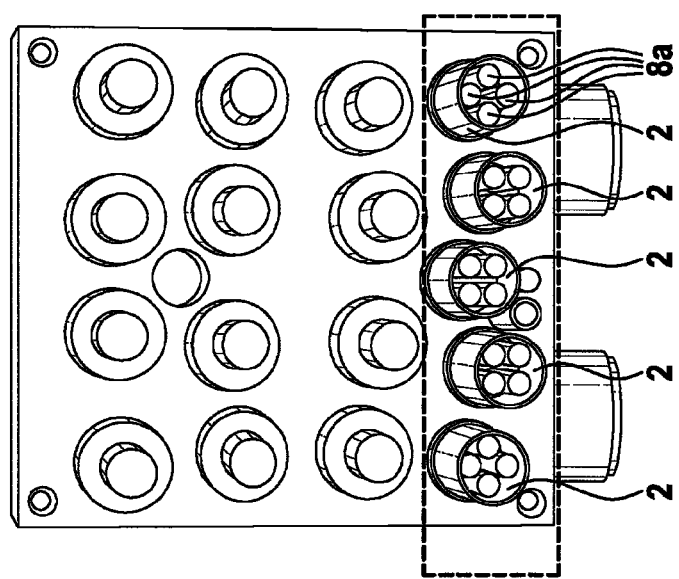

FIG. 2a shows an example of a configuration of a hydraulic aggregate system having five pressure sensors 2, each having four gold contacting pads 8 or gold contacts 8a per sensor 2. FIG. 2b shows the contacting to control device 4, with in each case four gold springs 8b per pressure sensor terminal, for contacting gold pads 8a.

Conventional pressure sensors each have four gold contactings, each having one gold pad, and use a gold spring contacting to the control device. Standardly, two contacts are used for supplying voltage to the pressure sensor, while two additional contacts form the signal line for outputting an analog pressure signal.

Conventionally, pressure sensors are wired and connected individually, so that, per pressure sensor, four pads in the sensor and four contact springs in the control device are required. As the number of sensors increases, the number of pads and springs required thus also increases proportionally. In the system shown in FIG. 1, in this way a total of 20 contact pads and 20 contact springs are used. This results in a high working outlay in the production of sensors and the control device, and is therefore a significant cost factor.

DISCLOSURE OF THE INVENTION

An object of the present invention is the reduction of the number of gold contactings for connecting the pressure sensors in the ESP control device.

For this purpose, according to the present invention the pressure sensors are connected to a control device using very fast digital bus-compatible two-wire interfaces, such as the Peripheral Sensor Interface (PSI5) or the Distributed System Interface (DSI).

PSI5 uses a two-wire lead, and is used in automotive electronics for connecting remotely situated sensors to electronic control devices. Using PSI5, it is possible to implement point-to-point and bus configurations with asynchronous and synchronous communication. The peripheral sensor interface uses a current interface with modulation of a transmit stream for data transmission on the supply line. Due to the relatively high signal current of 26 mA and the bit coding in Manchester code, a high degree of security against interference is achieved. In this way, the use of an economical twisted two-wire lead for the cabling is sufficient. Data words are made up of, respectively, two start bits, 8 to 24 data bits, and one parity bit or 3-bit CRC (Cyclic Redundancy Check).

Using a PSI interface, up to four pressure sensors can be connected via two lines. The lines are operated either as a serial bus or as a parallel bus, while the interface itself is fashioned as a current interface. This means that the two contacts or supply lines are used simultaneously, through current modulation, for the transmission of digital sensor data. By reducing the terminals to two, with simultaneous increase of the possible connected sensors to up to three or four or more, a modular assembly system of pressure sensor modules can be realized.

These are made up of assemblies having a large number of pressure sensors connected internally via the bus connection. Via a central current interface, these assemblies, or modules, can be connected to a control device, for example an ESP control device. Through the reduction of the required terminal contacts, in this way a control device housing can be realized in a simplified and economical manner. In addition, pressure sensor modules can be connected via a standardized, possibly geometrically or mechanically standardized, interface.

Thus, the core of the present invention is the use of a two-wire current interface in the connection of a pressure sensor in the ESP control device, instead of a separate voltage supply and a separate analog interface having a total of four terminal contacts or pins. In addition, in this way a combination of a plurality of pressure sensors can be realized that are connected together in a module at the ESP control device, and are connected thereto internally via a digital fast bus interface, such as PSI5 or DSI. For example, in this way it is possible to connect three pressure sensors via two contacts, and five pressure sensors for example via four contacts.

In this way, there results first of all a savings in cost in construction and connection technology due to a standard interface, as well as a savings of material costs due to the reduction of gold pads and gold springs for the connection. In addition, there is also a reduced work outlay in production, because for example fewer springs have to be put in place, or fewer pads have to be pressed in, which also makes it possible to increase the production cycle time.

Specific embodiments of the present invention are shown in the drawings and are explained in more detail in the following description.

Figure 3A:
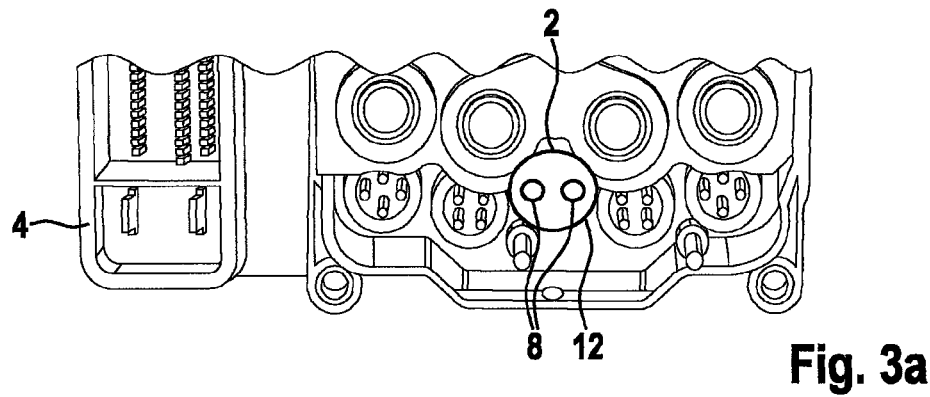
Figure 3B:
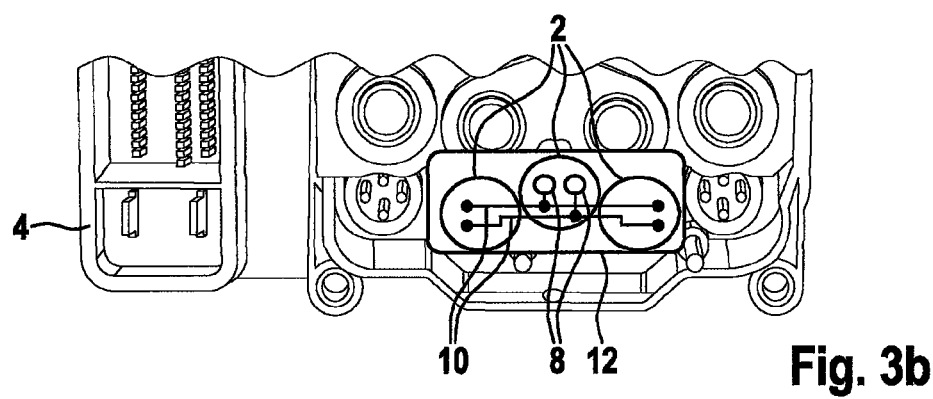
Figure 3C:
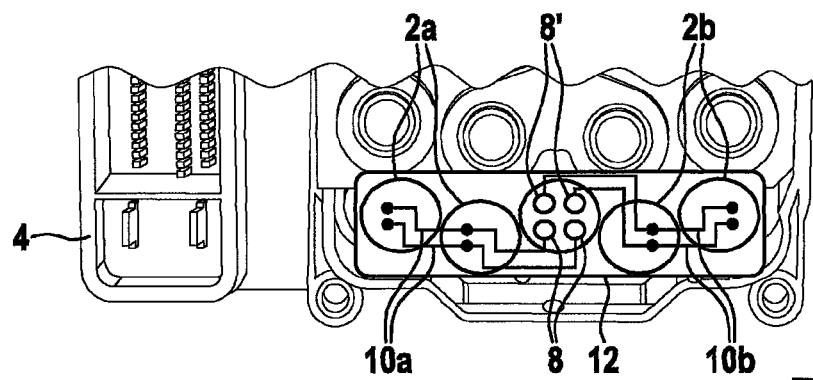

FIG. 1 shows an exemplary embodiment of a hydraulic system having five pressure sensors;

FIGS. 2a, b show an exemplary embodiment of a control device having five pressure sensors, each having four terminal contacts, and FIGS. 3a-c show exemplary embodiments of the connection of pressure sensors according to the present invention.

SPECIFIC EMBODIMENTS OF THE INVENTION

FIG. 3a shows, as an example, a connecting interface of a pressure sensor 2 to a control device 4, e.g. an ESP control device. Pressure sensor 2 uses only two contacts, or pins 8, for the connection.

The two-contact connection is realized by the use of a two-wire current interface between pressure sensor 2 and ESP control device 4 instead of a conventional voltage supply and separate analog interface having a total of four pins.

A plurality (in FIG. 3b three are shown as an example) of pressure sensors 2 can be connected among one another as module 12 using a communication bus 10, e.g. PSI5 or DSI, and can in addition be connected to a control device 4 via two contacts 8.

Here, bus 10 is fashioned, as an example, as a digital, bus-compatible two-wire interface at which, or to which, the individual pressure sensors 2 can be disposed or connected in parallel or in series.

FIG. 3c shows a module 12 in which there are situated a total of five pressure sensors 2a,b. The total of five pressure sensors 2a,b are connected to control device 4 via a total of four contacts 8,8'. Pressure sensors 2a are connected to contacts 8 using bus 10a, and via these contacts are connected to control device 4. The further pressure sensors 2b (two are shown as an example in FIG. 3c) are in turn connected to contacts 8' using bus 10b. Both pairs of contacts 8, 8' can be situated at a standardized location of module 12, and as a result module 12 as a whole can be easily and quickly plugged onto a control device 4, or connected thereto.

Thus, instead of building or connecting all the pressure sensors with four contacts each, in FIG. 3a a pressure sensor, in FIG. 3b a module having three pressure sensors, and in FIG. 3c a module having five pressure sensors, is connected to the control device. Here, module 12 having one pressure sensor has two pins 8, which realize a fast digital current interface, e.g. PSI5 or DSI.

Module 12 of FIG. 3b, having three pressure sensors, also has two pins 8, and likewise transmits the three pressure sensor signals to a digital synchronous or asynchronous current interface according to PSI5 or DSI. Module 12 of FIG. 3b has an inner connecting together of the sensors inside the module via a serial or parallel bus.

Module 12 of FIG. 3b having five pressure sensors has in turn four pins or contacts 8, 8'. The first two pins 8 provide the interface for the first three pressure sensors, comparable to the module of FIG. 3b, while two further pins or contacts 8' form the bus connection to the fourth and fifth pressure sensor 2. This are in turn connected internally as a parallel bus or serial bus, and, via the two contacts 8', are communicatively connected to the outside, or to control device 4.

Pressure sensors 2 can either be combined to form a common module 12, as an assembly, or the bus wiring can be made directly between the pressure sensors, e.g. as a simple conductor. However, a contacting on a circuit board in a control device 4 is not affected by this, and is further reduced to two (or four in the embodiment according to FIG. 3c).

As another embodiment, it is conceivable that all the pressure sensors are each connected to the circuit board of a control device directly with two contacts 8, instead of four contacts as previously. In this case, no bus is used between individual sensors 2; rather, each sensor 2 is contacted directly in or to control device 4.

In the case in which pressure sensors 2 are individually connected directly to control device 4, with two contacts 8 in each case, the bus according to the present invention can also be realized on the circuit board of, or in, ESP control device 4, thus wiring together a plurality of pressure sensors 2 with a parallel bus or serial bus. In this way, circuit board surface area and printed conductors on a circuit board, or in a control device 4, can be reduced.

Via such a retrofit wiring, it is also possible to realize a direct connection of pressure sensors 2 via two individual lines to an interface component. In other words, this means that the contacting of each pressure sensor itself to the control device can take place with two contacts, while the actual bus line is situated on the circuit board of an ESP control device, so that the interface component that forms the supply and the protocol for the communication is installed only in the ESP control device, directly on the circuit board, and there is no further receiver in the pressure sensor module. For this, the number of contacts can be reduced to a lesser extent; i.e., given five pressure sensors, there will result at least ten contacts, instead of 20 as previously.

What is claimed is:

1. A sensor module for a regulating system in a vehicle, comprising:
   a first plurality of sensor elements that are connected to one another;
   a second plurality of sensor elements that are connected to one another;
   a first interface element set up for a communicative connection of the first plurality of sensor elements to a control device in the vehicle; and
   a second interface element for a communicative connection of the second plurality of sensor elements to the control device, wherein:

the first interface element and the second interface element are housed within a housing of only one sensor element, the first interface element is a two-contact interface element, the first plurality of sensor elements omit any contact interface and communicate with the control device only through a direct contact of the two-contact interface of the first interface element with the control device, the second interface element is a two-contact interface element, the second plurality of sensor elements omit any contact interface and communicate with the control device only through a direct contact of the two-contact interface element of the second interface element with the control device, each sensor element is housed within its own respective housing, each sensor element having a housing that lacks the first interface element and the second interface element and is directly connected to the sensor element having a housing that contains the first interface element and the second interface element, or to another sensor element having a housing that lacks the first interface element and the second sensor element.

2. The sensor module as recited in claim 1, wherein each of the first interface element and the second interface element includes one of a digital interface element, a bus-compatible interface element, a peripheral sensor interface element, a distributed system interface element, a current interface element, and a current modulation interface element.

3. The sensor module as recited in claim 1, wherein:
each sensor element is a pressure sensor element, and
each sensor element determines a pressure in a hydraulic line.

4. A control device, comprising:
at least one sensor module that includes:
a first plurality of sensor elements that are connected to one another;
a second plurality of sensor elements that are connected to one another;
a first interface element set up for a communicative connection of the first plurality of sensor elements to a control device in the vehicle; and
a second interface element for a communicative connection of the second plurality of sensor elements to the control device, wherein:
the first interface element and the second interface element are housed within only one sensor element,
the first interface element is a two-contact interface element,
the first plurality of sensor elements omit any contact interface and communicate with the control device only through a direct contact of the two-contact interface of the first interface element with the control device,
the second interface element is a two-contact interface element,
the second plurality of sensor elements omit any contact interface and communicate with the control device only through a direct contact of the two-contact interface element of the second interface element with the control device,
and
each sensor element having a housing that lacks the first interface element and the second interface element and is directly connected to the sensor element having a housing that contains the first interface element and the second interface element, or to another sensor element having a housing that lacks the first interface element and the second sensor element.

5. The control device as recited in claim 4, wherein each of the first plurality of sensor elements and the second plurality of sensor elements includes three sensors.

6. The control device as recited in claim 4, wherein:
the first plurality of sensor elements includes exactly three sensors, and
the second plurality of sensor elements includes exactly two sensors.

7. The control device as recited in claim 4, wherein the control device includes a brake regulating system control device.

8. The control device as recited in claim 7, wherein the brake regulating system control device includes an ESP regulating system control device.

9. A vehicle, comprising:
a control device including:
at least one sensor module that includes:
a first plurality of sensor elements that are connected to one another;
a second plurality of sensor elements that are connected to one another;
a first interface element set up for a communicative connection of the first plurality of sensor elements to a control device in the vehicle; and
a second interface element for a communicative connection of the second plurality of sensor elements to the control device, wherein:
the first interface element and the second interface element are housed within only one sensor element,
the first interface element is a two-contact interface element,
the first plurality of sensor elements omit any contact interface and communicate with the control device only through a direct contact of the two-contact interface of the first interface element with the control device,
the second interface element is a two-contact interface element,
the second plurality of sensor elements omit any contact interface and communicate with the control device only through a direct contact of the two-contact interface element of the second interface element with the control device,
and
each sensor element having a housing that lacks the first interface element and the second interface element is directly connected to the sensor element having a housing that contains the first interface element and the second interface element, or to another sensor element having a housing that lacks the first interface element and the second sensor element.

10. The vehicle as recited in claim 9, wherein the vehicle includes at least one of an electric vehicle and a hybrid vehicle.

* * * * *